US010570887B2

(12) United States Patent
Son et al.

(10) Patent No.: US 10,570,887 B2
(45) Date of Patent: Feb. 25, 2020

(54) VIBRATION MONITORING AND DIAGNOSING SYSTEM FOR WIND POWER GENERATOR

(71) Applicant: DOOSAN HEAVY INDUSTRIES & CONSTRUCTION CO., LTD., Changwon-si (KR)

(72) Inventors: Jong Duk Son, Suwon-si (KR); Jeong Hoon Lee, Daejeon (KR); Ki Hak Lee, Yongin-si (KR); Seung Man Eom, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 377 days.

(21) Appl. No.: 15/618,617

(22) Filed: Jun. 9, 2017

(65) Prior Publication Data
US 2017/0363072 A1    Dec. 21, 2017

(30) Foreign Application Priority Data
Jun. 21, 2016    (KR) .......................... 10-2016-0077112

(51) Int. Cl.
F03D 17/00     (2016.01)
G01H 1/00      (2006.01)
G01P 15/00     (2006.01)
(52) U.S. Cl.
CPC ............. F03D 17/00 (2016.05); G01H 1/006 (2013.01); G01P 15/00 (2013.01);
(Continued)
(58) Field of Classification Search
CPC ................................ F03D 17/00; G01H 1/003
(Continued)

(56) References Cited

U.S. PATENT DOCUMENTS 10,012,213 B2 *   7/2018   Chacon ................ F03D 7/0244
2005/0284225 A1 * 12/2005   Luo ........................ F16H 57/01
                                                        73/593
(Continued)

FOREIGN PATENT DOCUMENTS

JP    2009-243428 A    10/2009
JP    2012-052445 A     3/2012
(Continued)

OTHER PUBLICATIONS

Communication dated Oct. 18, 2017, by the European Patent Office in counterpart European Application No. 17176997.9.
(Continued)

Primary Examiner — Ricky Ngon
(74) Attorney, Agent, or Firm — Invenstone Patent, LLC

(57) ABSTRACT

Disclosed herein is a vibration monitoring and diagnosing system for monitoring conditions of a wind power generator and diagnosing a defective portion thereof using vibration characteristics obtained from acceleration sensors mounted to the wind power generator. A vibration-based defect detecting method may include: collecting vibration data of the wind power generator using the plurality of sensors; extracting a first characteristic value of a time domain based on the vibration data; extracting characteristic values in one or more frequency bands for a location of each sensor in a frequency domain or an envelope frequency domain if the first characteristic value is greater than a preset alarm setting value; and determining that a defect is present when at least one characteristic value of the characteristic values is greater than a preset normal value.

18 Claims, 9 Drawing Sheets

(52) U.S. Cl.
CPC ..... *F05B 2200/211* (2013.01); *F05B 2200/30* (2013.01); *F05B 2260/80* (2013.01); *F05B 2260/96* (2013.01); *F05B 2270/334* (2013.01); *F05B 2270/807* (2013.01)

(58) Field of Classification Search
USPC .......................................................... 702/58
See application file for complete search history.

(56) References Cited

U.S. PATENT DOCUMENTS

| | | | |
|---|---|---|---|
| 2008/0234964 A1 | 9/2008 | Miyasaka et al. | |
| 2009/0266160 A1* | 10/2009 | Jeffrey | G01H 1/006 73/455 |
| 2012/0133135 A1* | 5/2012 | Su | F03D 7/0264 290/44 |
| 2013/0110414 A1* | 5/2013 | Caponetti | F03G 7/00 702/35 |
| 2013/0325373 A1* | 12/2013 | Qiao | G01R 19/2509 702/58 |
| 2014/0049285 A1* | 2/2014 | Rodriguez | G01H 1/003 324/765.01 |
| 2015/0134272 A1* | 5/2015 | Fu | F03D 17/00 702/35 |
| 2015/0159632 A1* | 6/2015 | Vangen | F03D 17/00 416/61 |
| 2015/0322924 A1* | 11/2015 | Menasanch De Tobaruela | F03D 1/06 73/660 |
| 2016/0033580 A1* | 2/2016 | Qiao | G01R 31/343 324/765.01 |
| 2017/0335827 A1* | 11/2017 | Wilson | F03D 7/048 |
| 2019/0048854 A1* | 2/2019 | Oshetski | F01D 5/02 |

FOREIGN PATENT DOCUMENTS

| | | |
|---|---|---|
| JP | 2013-185507 A | 9/2013 |
| JP | 2015-175828 A | 10/2015 |
| KR | 10-0954090 B1 | 4/2010 |
| WO | 02/073150 A2 | 9/2002 |
| WO | 2016/017396 A1 | 2/2016 |
| WO | 2016/089238 A1 | 6/2016 |

OTHER PUBLICATIONS

International Search Report dated Oct. 12, 2017, in counterpart International Application No. PCT/KR2017/006490.

* cited by examiner

[FIG. 1]
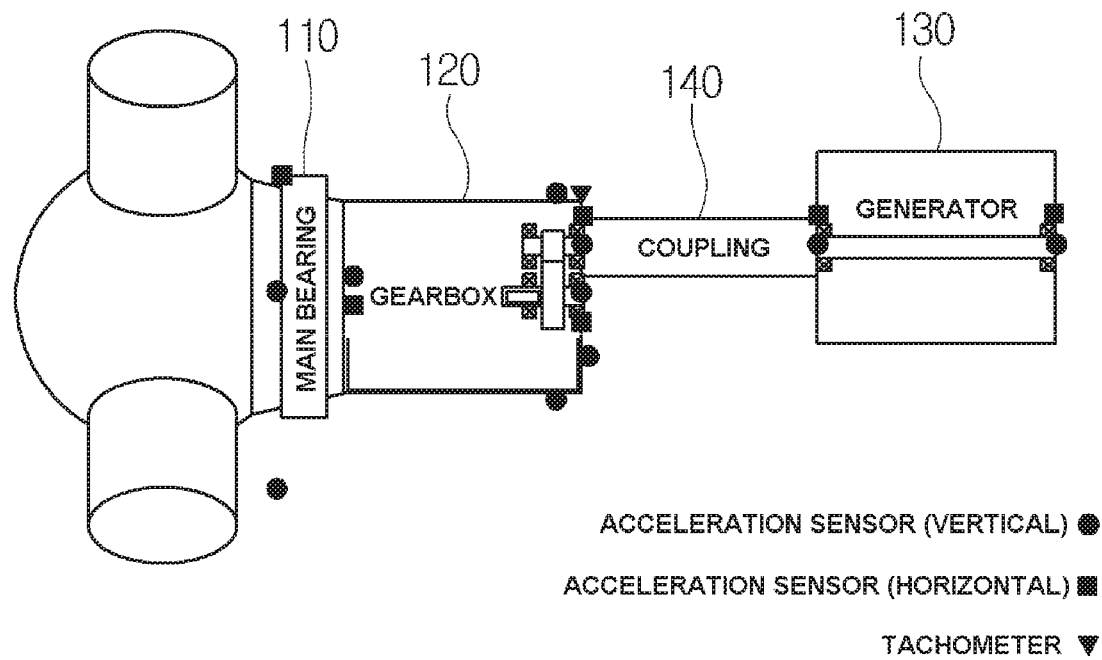

[FIG. 2]
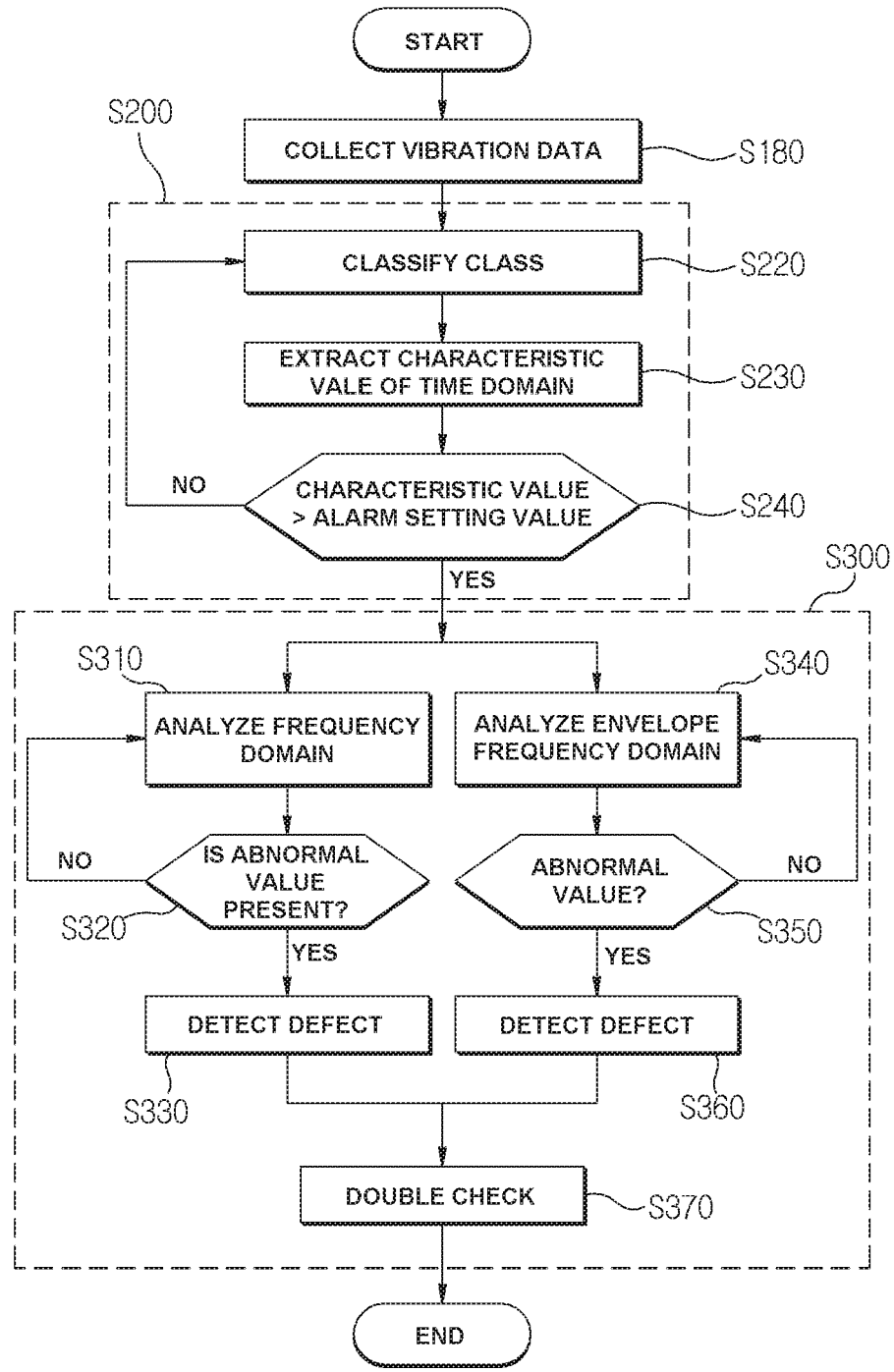

[FIG. 3]
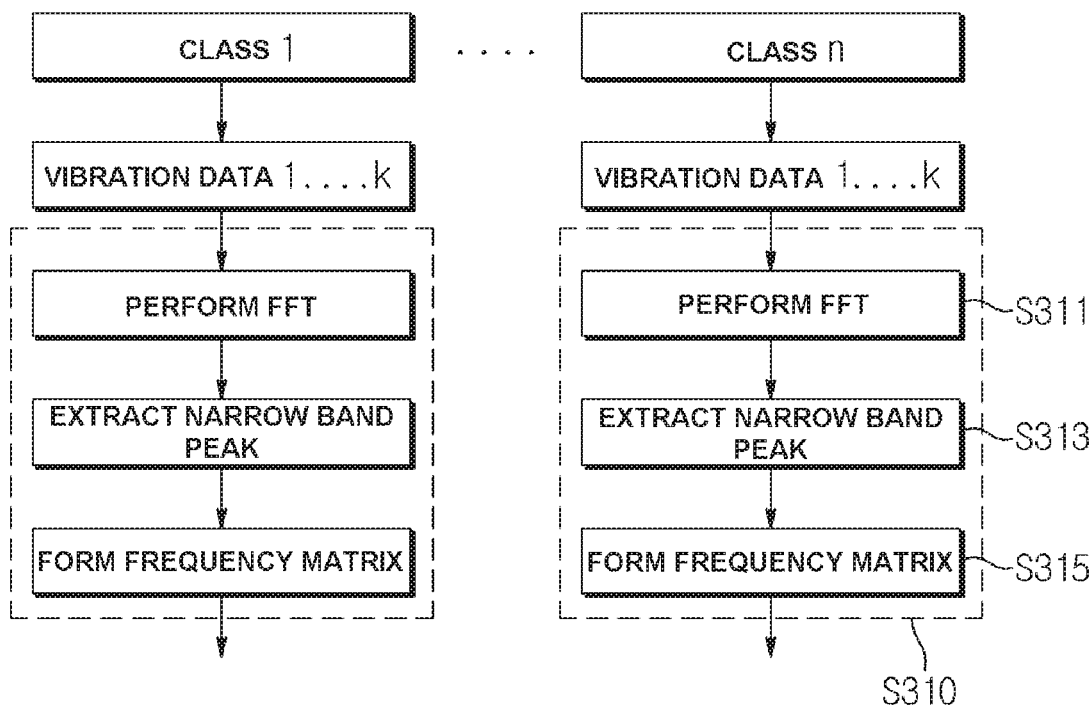
[FIG. 4]
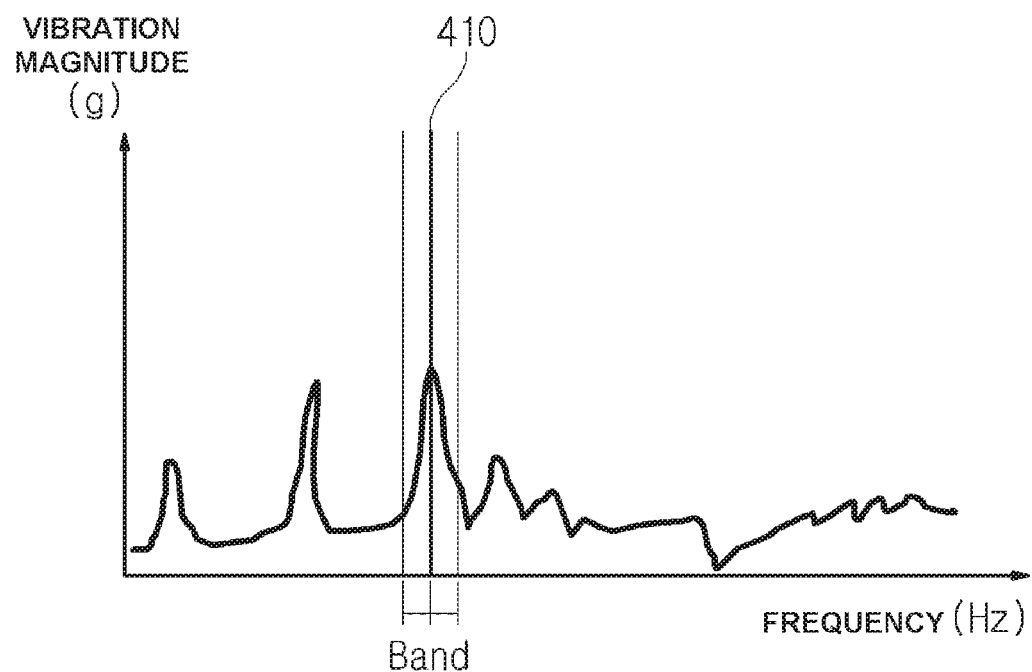

[FIG. 5]
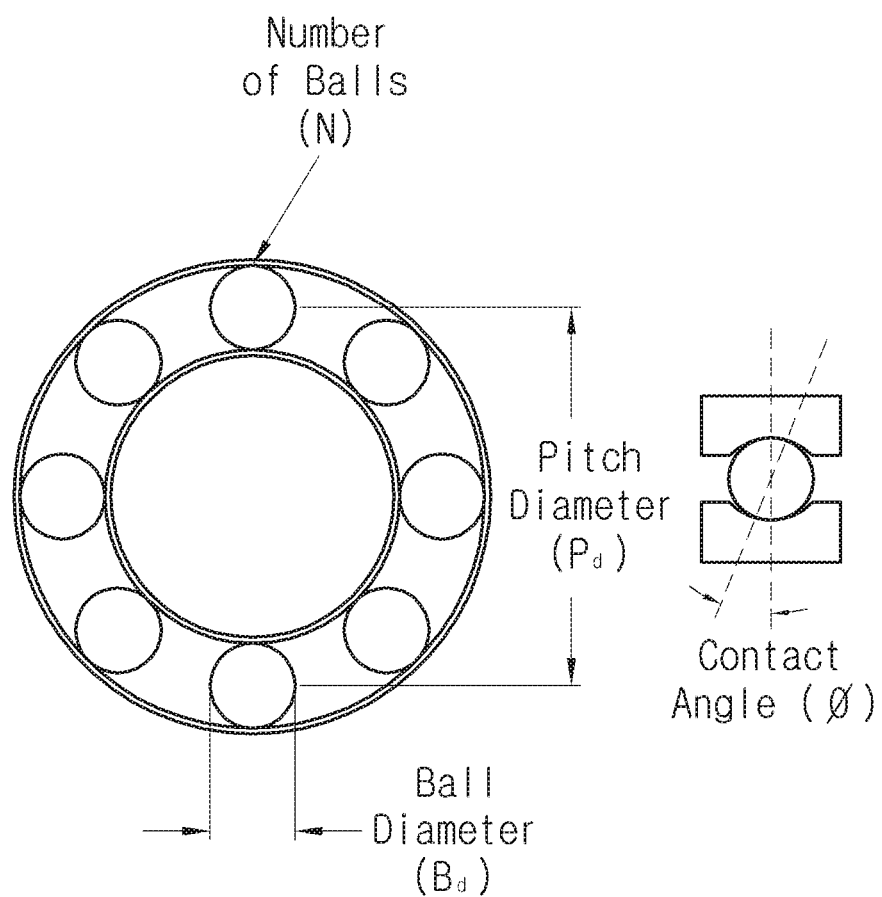

[FIG. 6]
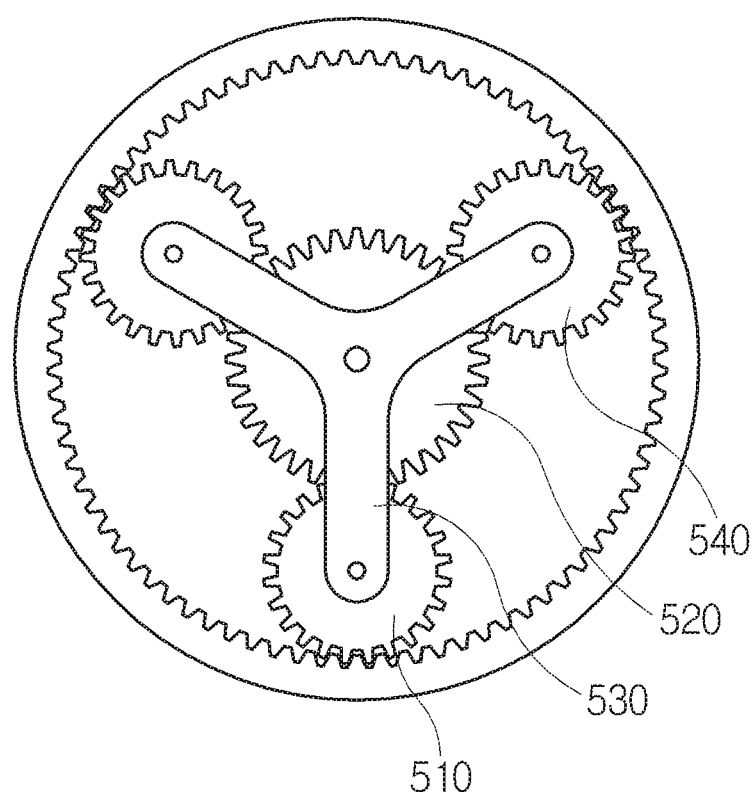

[FIG. 7]
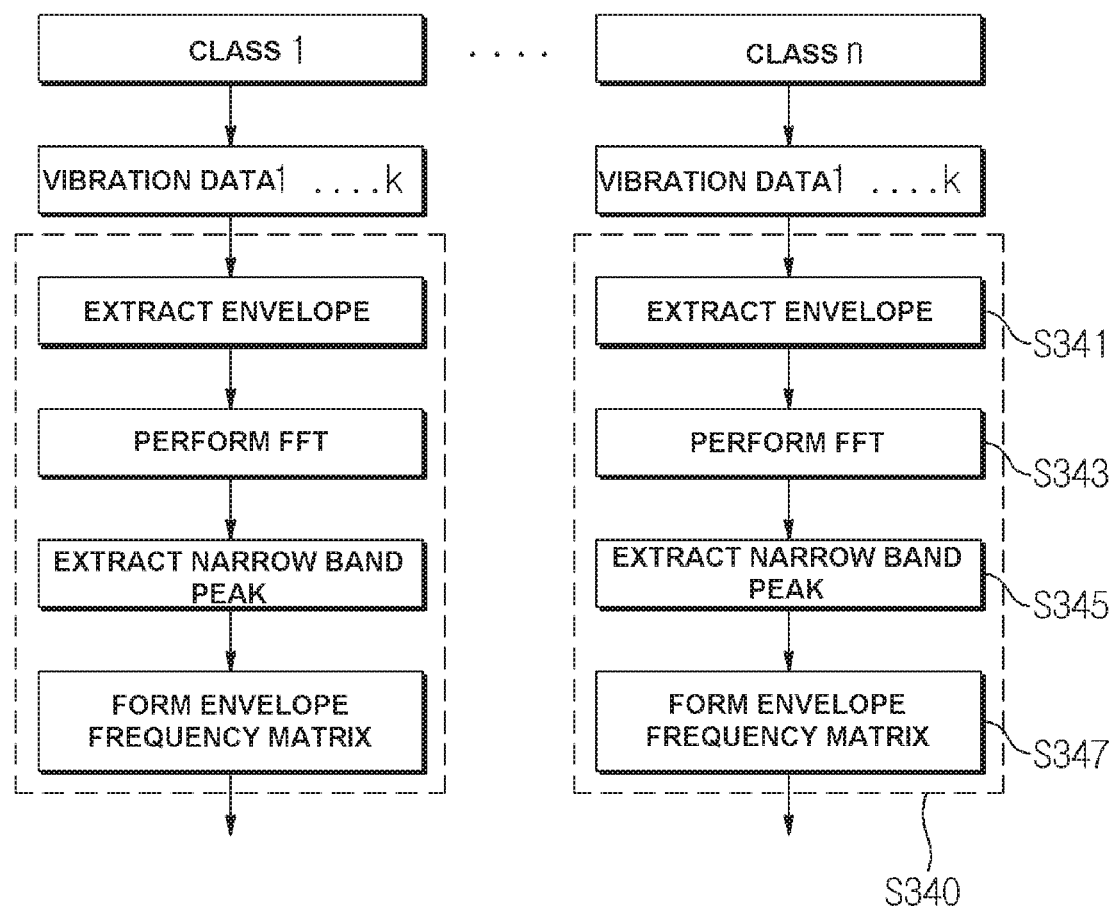

[FIG. 8]
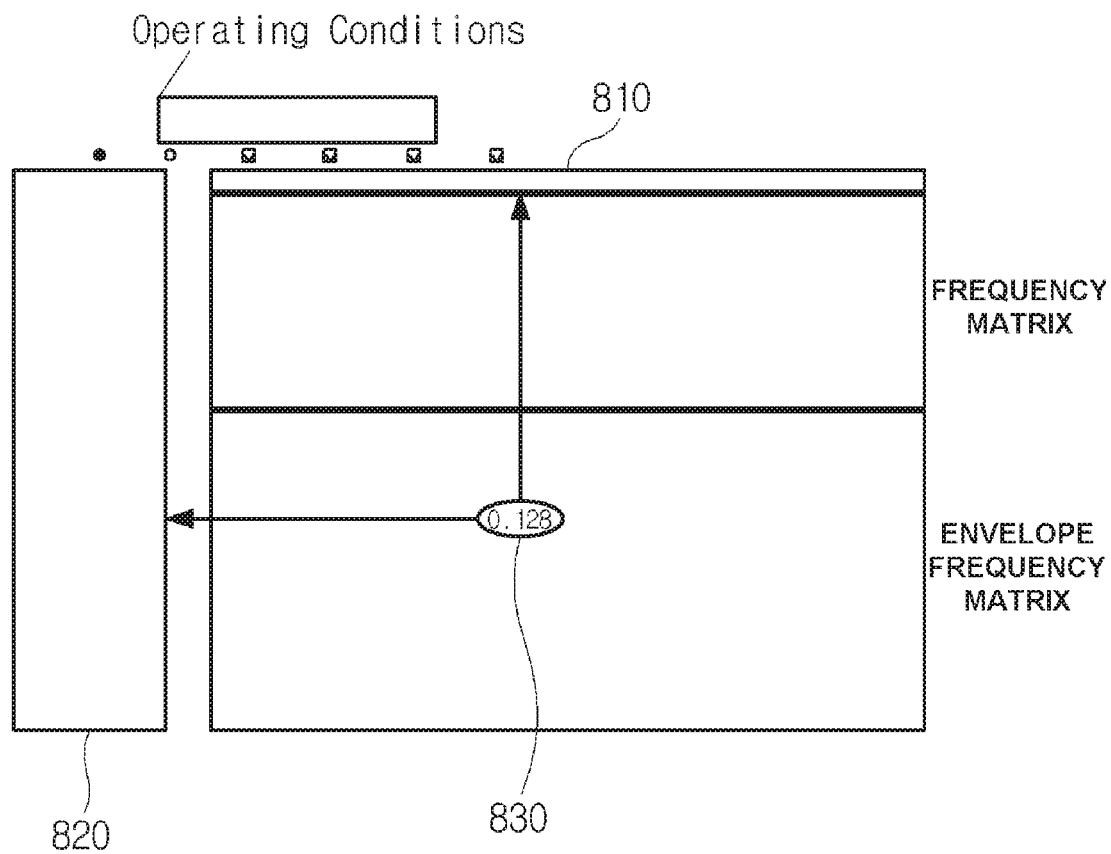
[FIG. 9]
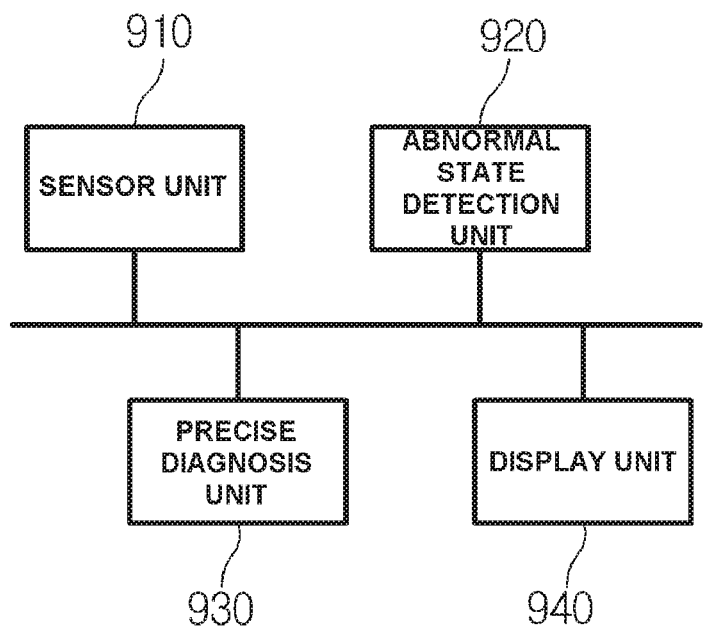

[FIG. 10]
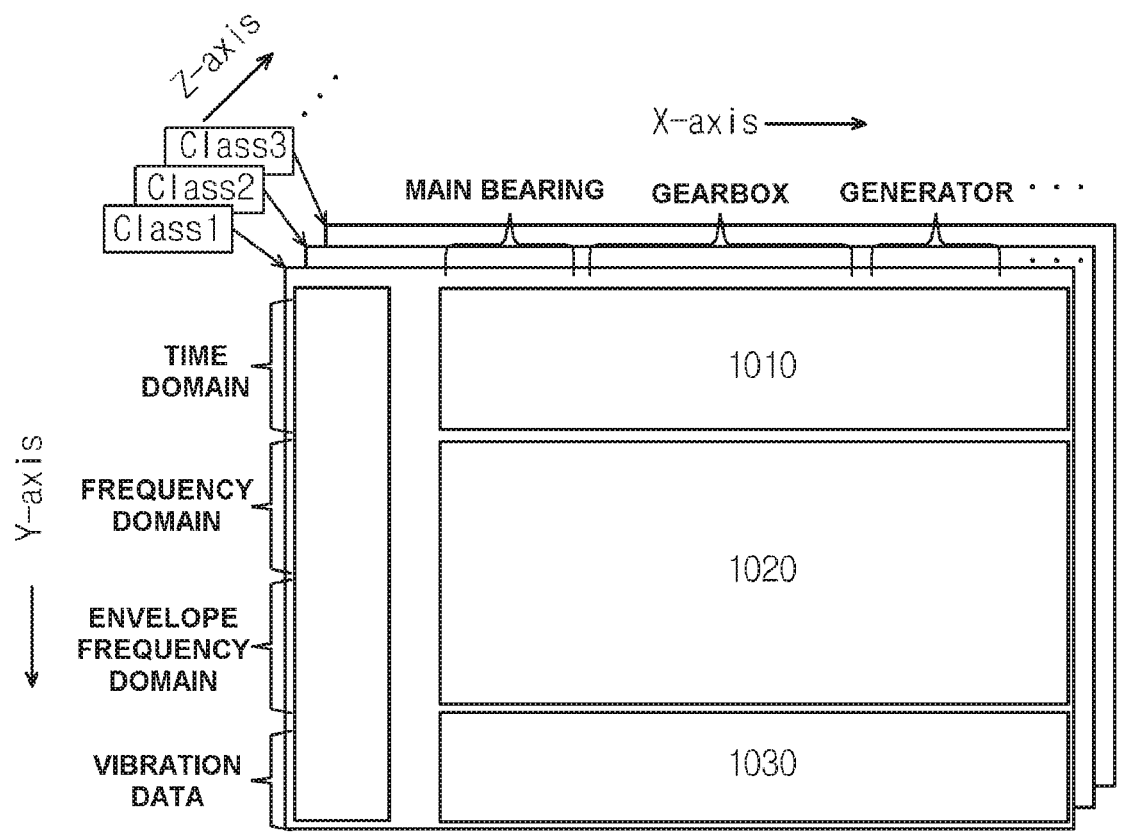

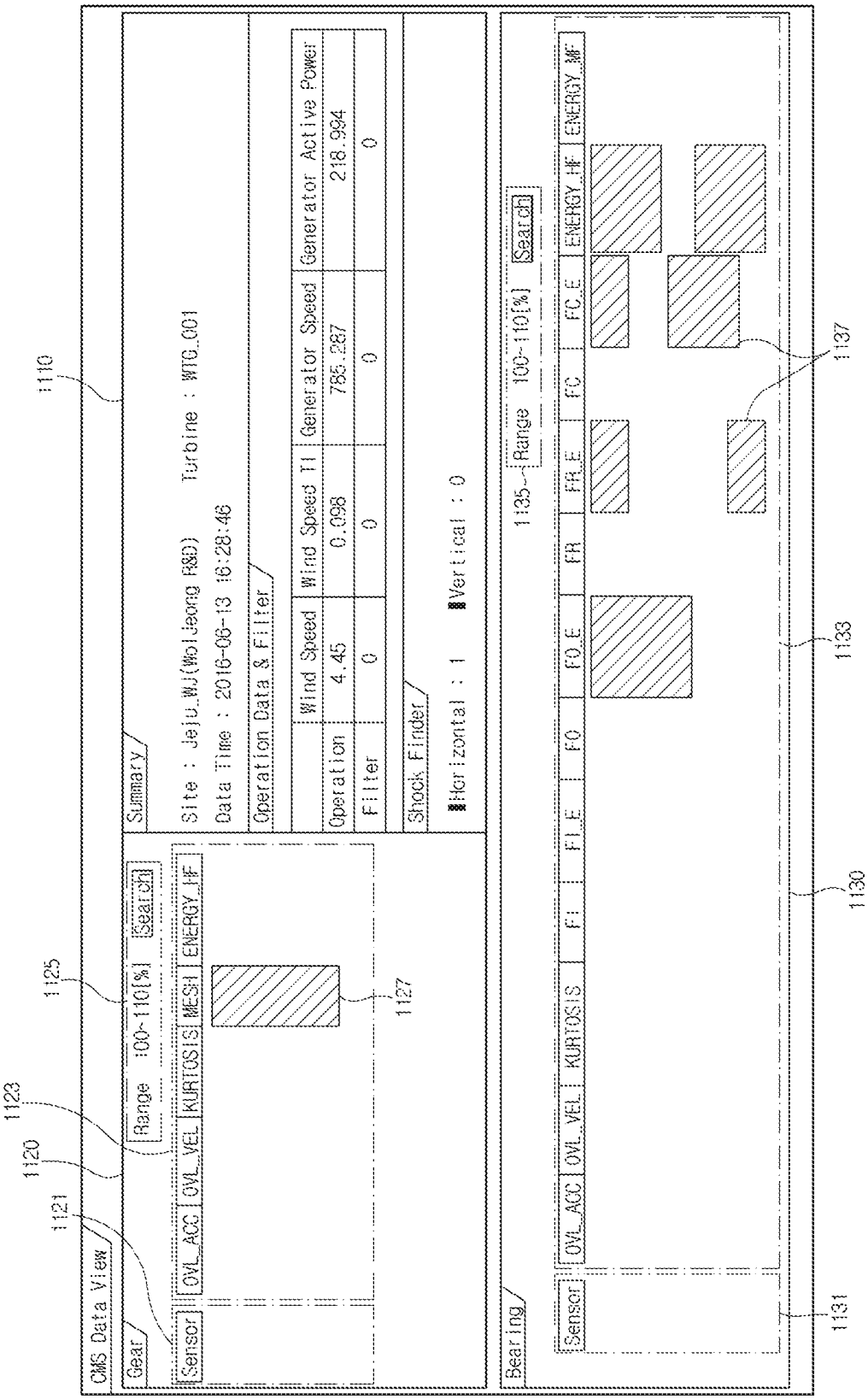
[FIG. 11]

VIBRATION MONITORING AND DIAGNOSING SYSTEM FOR WIND POWER GENERATOR

CROSS-REFERENCE TO RELATED APPLICATION(S)

This application claims priority to Korean Patent Application No. 10-2016-0077112, filed on Jun. 21, 2016, the disclosure of which is incorporated herein by reference in its entirety.

BACKGROUND OF THE INVENTION

Field of the Invention

Exemplary embodiments of the present invention relate to a system for monitoring and diagnosing conditions of a wind power generator, and more particularly, to a vibration monitoring and diagnosing system for monitoring conditions of a wind power generator and diagnosing a defective portion thereof using vibration characteristics obtained from acceleration sensors mounted to the wind power generator.

Description of the Related Art

Recently, because of exhaustion of fossil energy and environmental issues such as climate changes and greenhouse gas mitigation, investments in development of new renewable energy is increasing, and demand for wind power generators is globally increasing.

With spread of such energy supply, 3.4% of total world electricity consumption in 2014 was produced by wind power generators, and it is expected that it reaches 5.3% in 2019.

However, such wind power generators are equipment that it is difficult to manage compared to thermal or nuclear power generation equipment, because a comparatively large number of apparatuses are required per unit power generation capacity, and work for maintenance or repair is easily affected by accessibility depending on weather conditions, supply and demand of components and maintenance equipment, the number of workers, etc.

In particular, with regard to offshore wind power systems, there are restrictions on access to the wind power systems depending on the wind speed and the height of waves. Thus, detecting malfunction of components in early stages and establishing a maintenance plan for preventing a serious accident are essential to reduce the maintenance cost. To achieve the above-mentioned purpose, various systems for monitoring conditions of wind power generators have been proposed. Such systems for monitoring the conditions of the wind power generators are important means which makes it possible to detect malfunction of a component in an early stage and determine a proper time for maintenance in terms of predictive maintenance and state-based maintenance.

Particularly, a state monitoring system for monitoring vibration conditions of a wind power generator and monitoring conditions of the wind power generator using the obtained vibration conditions is known as a system suitable for monitoring and diagnosing the conditions of mechanical rotating components of the wind power generator. Recently, research on a method of monitoring and diagnosing conditions of a wind power generator become appreciably more active.

It is a question of how much effectively and reliably a proposed system can monitor and diagnose conditions of a wind power generator.

PRIOR ART DOCUMENT

[Patent Document] Korean Patent Registration No. 1345598 (date: Dec. 27, 2013)

SUMMARY OF THE INVENTION

An object of the present invention is to provide a vibration monitoring and diagnosing system for a wind power generator which is capable of monitoring and diagnosing conditions of the wind power generator using data about vibration on a main bearing, a gearbox, and a generator which constitute a rotating machine of the wind power generator, thus making it possible to effectively and reliably monitor and diagnose the conditions of the wind power generator.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a vibration-based defect detecting method of detecting a defect of a wind power generator using vibration data collected from a plurality of sensors, the vibration-based defect detecting method including: collecting vibration data of the wind power generator using the plurality of sensors; extracting a first characteristic value of a time domain based on the vibration data; and determining whether the first characteristic value is greater than a preset alarm setting value, and detecting, when it is determined that the first characteristic value is greater than a preset alarm setting value, a defect by extracting a characteristic value of a frequency domain obtained by performing a Fourier transform operation on the vibration data, wherein the detecting of the defect by extracting the characteristic value of the frequency domain may include: extracting, based on the respective vibration data collected by the plurality of sensors, second characteristic values for one or more preset frequency bands by each of the sensors in the frequency domain; extracting, based on the respective vibration data collected by the plurality of sensors, third characteristic values for one or more preset frequency bands by each of the sensors in an envelope frequency domain; and determining that a defect is present when at least one characteristic value of the second characteristic values or the third characteristic values is a preset normal value or more. The vibration-based defect detecting method may further include detecting, when the at least one characteristic value of the second characteristic values or the third characteristic values is the preset normal value or more, a location and a kind of the defect based on a frequency band and a location of a corresponding sensor from which the at least one characteristic value has been extracted.

The first characteristic value includes at least one of a root mean square, a kurtosis, and a crest factor, the root mean square ($x_{rms}$) is calculated by $$x_{rms} = \sqrt{\frac{\sum_{i=1}^{n} x_i^2}{n}},$$

the kurtosis ($x_k$) is calculated by $$x_k = \frac{E(y_i)^4}{\sigma^4} = \frac{\frac{1}{n}\sum_{i=1}^{n}(x_i - \bar{x})^4}{\left(\sqrt{\frac{1}{n}\sum_{i=1}^{n}(x_i - \bar{x})^2}\right)^4},$$

and the crest factor ($x_c$) is calculated by $$x_c = \frac{|x_{peak}|}{x_{rms}},$$

and wherein $x_i$ denotes the collected vibration data, $\bar{x}$ denotes an average of the vibration data, and $|x_{peak}|$ denotes a peak value of an absolute value of the vibration data.

The extracting of the second characteristic values for the one or more preset frequency bands by each of the sensors in the frequency domain based on the respective vibration data collected by the sensors may include: performing a fast Fourier transform (FFT) operation based on the vibration data for each of the sensors; and extracting, as a second characteristic value based on a result of the performing of the FFT operation, a peak value in each of the one or more certain frequency bands for each location. The extracting of the third characteristic values for the one or more preset frequency bands by each of the sensors in the envelope frequency domain based on the respective vibration data collected by the sensors may include: extracting an envelope from the vibration data for each of the sensors; performing a fast Fourier transform (FFT) operation based on the envelope; and extracting, as a third characteristic value based on a result of the performing of the FFT operation, a peak value in each of the one or more certain frequency bands for each location. The extracting of the envelope from the vibration data may include: passing the vibration data through a band pass filter; obtaining an absolute value of an output of the band pass filter; and passing the obtained absolute value through a low pass filter. Each of the one or more certain frequency bands may include at least one of six frequency bands each of which has, as a center frequency, a frequency $f_r$, $f_c$, $f_s$, $f_o$, $f_i$, or GMF calculated by Equations (1) to (6), and includes opposite ends each of which is spaced apart from the center frequency by 1 Hz.

$$f_r = \frac{\text{rpm}}{60} = rps, \quad \text{Equation (1)}$$

$$f_c = \frac{f_r}{2}\left[1 - \frac{B_d}{P_d}\cos\phi\right], \quad \text{Equation (2)}$$

$$f_s = \frac{P_d}{2B_d}f_r\left[1 - \left(\frac{B_d}{P_d}\cos\phi\right)^2\right], \quad \text{Equation (3)}$$

$$f_o = N(FTF) = \frac{f_r}{2}N\left[1 - \frac{B_d}{P_d}\cos\phi\right], \quad \text{Equation (4)}$$

$$f_i = N(f_r - FTF) = \frac{f_r}{2}N\left[1 + \frac{B_d}{P_d}\cos\phi\right], \text{ and} \quad \text{Equation (5)}$$

$$GMF = (T_R + T_S) \times N_O = (T_R \times N_R) + (N_S \times T_S) \quad \text{Equation (6)}$$

The vibration-based defect detecting method may further include: forming a frequency matrix having respective locations of the plurality of sensors and the one or more frequency bands as a row and a column and having the second characteristic values as values of the matrix, and an envelope frequency matrix having respective locations of the plurality of sensors and the one or more frequency bands as a row and a column and having the third characteristic values as values of the matrix; and displaying the frequency matrix and the envelope frequency matrix on a display.

The vibration data may be classified into a plurality of classes according to operation conditions. The above-mentioned operations may be performed for each of the plurality of classes.

In accordance with another aspect of the present invention, a vibration-based defect detecting system of detecting a defect of a wind power generator including a main bearing, a gearbox, and a generator using vibration data collected from a plurality of sensors, the vibration-based defect detecting system including: a sensor unit comprising a plurality of sensors mounted to the wind power generator and configured to collect the vibration data; an abnormal state detection unit configured to extract a first characteristic value of a time domain based on the vibration data collected by the sensor unit and detect whether the wind power generator is in an abnormal state; and a precise diagnosis unit configured to determine, when an abnormal state detection signal is received from the abnormal state detection unit, a location and a kind of a defect by extracting a characteristic value of a frequency domain obtained by performing a Fourier transform operation on the vibration data collected by the sensor unit.

The plurality of sensors may include one tachometer and fifteen acceleration sensors. The tachometer may be mounted to a driven shaft extending from the gearbox to the generator and is configured to measure an RPM of the driven shaft. The fifteen acceleration sensors may include two accelerations configured to measure vertical and horizontal vibrations on the main bearing, one acceleration sensor provided on each of an left end and a right end of a torque arm of the gearbox coupled with the main shaft, one acceleration sensor configured to measure vibration of a mechanical pump bearing, one acceleration sensor configured to measure vibration of a wheel bearing of a third gear stage of the gearbox, one acceleration sensor configured to measure vibration of a drive shaft of the third gear stage of the gearbox, two acceleration sensors configured to measure vibration of a driven shaft of the third gear stage of the gearbox, two acceleration sensors configured to measure horizontal and vertical vibrations at a side of the generator which is coupled with the gearbox so as to measure vibration of the generator, and two acceleration sensors configured to measure horizontal and vertical vibrations at a side opposite to the side of the generator that is coupled with the gearbox, and two acceleration sensors configured to collect front/rear direction vibration and left/right direction vibration of the wind power generator.

The abnormal state detection unit may calculate a first characteristic value including at least one of a root mean square, a kurtosis, and a crest factor based on the vibration data, and determines that the wind power generator is in an abnormal state when the first characteristic value is a preset alarm setting value or more, wherein the root mean square ($x_{rms}$) is calculated by $$x_{rms} = \sqrt{\frac{\sum_{i=1}^{n} x_i^2}{n}},$$

the kurtosis ($x_k$) is calculated by $$x_k = \frac{E(y_i)^4}{\sigma^2} = \frac{\frac{1}{n}\sum_{i=1}^{n}(x_i - \bar{x})^4}{\left(\sqrt{\frac{1}{n}\sum_{i=1}^{n}(x_i - \bar{x})^2}\right)^4},$$

and the crest factor ($x_c$) is calculated by $$x_c = \frac{|x_{peak}|}{x_{rms}},$$

and wherein $x_i$ denotes the collected vibration data, $\bar{x}$ denotes an average of the vibration data, and $|x_{peak}|$ denotes a peak value of an absolute value of the vibration data.

The precise diagnosis unit may perform a fast Fourier transform (FFT) based on the vibration data for the sensors collected by the respective sensors. The precise diagnosis unit may calculate, based on a result of the performing of the FFT operation, second characteristic values each of which is a peak value in each of one or more certain frequency bands for each location. When at least one of the second characteristic values is greater than a preset normal value, the precise diagnosis unit may determine that a defect is present, and determine a location and a kind of the defect based both on a location of a sensor that has obtained the at least one second characteristic value and on the one or more preset center frequencies.

The precise diagnosis unit may extract an envelope of the vibration data for each of the plurality of sensors. The precise diagnosis unit may perform a fast Fourier transform (FFT) operation based on the envelope. The precise diagnosis unit may calculate, based on a result of the performing of the FFT operation, third characteristic values each of which is a peak value in each of one or more certain frequency bands for each location. When at least one of the third characteristic values is greater than a preset normal value, the precise diagnosis unit may determine that a defect is present, and determine a location and a kind of the defect based both on a location of the sensor that has obtained the at least one third characteristic value and on the preset center frequency. The vibration-based defect detecting system may further include a display unit. An envelope frequency matrix, having the locations and the one or more certain frequency bands as a row and a column and including the third characteristic values as values of the matrix, may be formed. The envelope frequency matrix may be displayed on the display unit. The precise diagnosis unit may be configured to extract the envelope by passing the vibration data through a band pass filter, obtaining an absolute value of an output of the band pass filter, and passing the obtained absolute value through a low pass filter.

Each of the one or more certain frequency bands may include at least one of six frequency bands each of which has, as a center frequency, a frequency $f_r$, $f_c$, $f_s$, $f_o$, $f_i$, or GMF calculated by Equations (1) to (6), and includes opposite ends each of which is spaced apart from the center frequency by 1 Hz.

$$f_r = \frac{\text{rpm}}{60} = rps, \quad \text{Equation (1)}$$

$$f_c = \frac{f_r}{2}\left[1 - \frac{B_d}{P_d}\cos\phi\right], \quad \text{Equation (2)}$$

$$f_s = \frac{P_d}{2B_d}f_r\left[1 - \left(\frac{B_d}{P_d}\cos\phi\right)^2\right], \quad \text{Equation (3)}$$

$$f_o = N(FTF) = \frac{f_r}{2}N\left[1 - \frac{B_d}{P_d}\cos\phi\right], \quad \text{Equation (4)}$$

$$f_i = N(f_r - FTF) = \frac{f_r}{2}N\left[1 + \frac{B_d}{P_d}\cos\phi\right], \text{ and} \quad \text{Equation (5)}$$

$$GMF = (T_R + T_S) \times N_O = (T_R \times N_R) + (N_S \times T_S) \quad \text{Equation (6)}$$

As described above, the present invention provides an effective and reliable state monitoring and diagnosis system based on vibration characteristics of a wind power generator, thus making it possible for an operator to detect a malfunction of a component in early stage and establish a maintenance plan for preventing a serious accident.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a diagram illustrating positions of sensors for monitoring conditions of vibration of a wind power generator according to an embodiment of the present invention.

FIG. 2 is a flowchart showing a vibration monitoring and diagnosing method of a vibration monitoring and diagnosing system for the wind power generator according to an embodiment of the present invention.

FIG. 3 is a flowchart showing a frequency domain analysis process according to an embodiment of the present invention.

FIG. 4 is a diagram illustrating a frequency characteristic obtained by performing an FFT operation for vibration data and a method of extracting a narrowband peak according to an embodiment of the present invention.

FIG. 5 is a diagram illustrating parameters for calculating a defect frequency of a bearing.

FIG. 6 is a diagram showing parameters for calculating a GMF of a planetary gear of an accelerating unit 120.

FIG. 7 is a flowchart showing an envelope frequency domain analysis process according to an embodiment of the present invention.

FIG. 8 is a diagram illustrating an embodiment showing a frequency matrix and an envelope frequency matrix according to the present invention.

FIG. 9 is a schematic block diagram of a system of detecting a vibration-based defect of the wind power generator according to an embodiment of the present invention.

FIG. 10 is a diagram illustrating an embodiment of displaying an analysis result on a display unit 940 according to the present invention.

FIG. 11 is a diagram illustrating another embodiment of displaying an analysis result on the display unit 940 according to the present invention.

DESCRIPTION OF SPECIFIC EMBODIMENTS

Hereinafter, embodiments of the present invention will be described in detail with reference to the attached drawings, such that those skilled in the art can easily implement the present invention. The present invention may be embodied in various different forms without being limited to the following embodiments.

Furthermore, in the drawings, portions which are not related to the present invention will be omitted to explain the present invention more clearly. Reference should be made to the drawings, in which similar reference numerals are used throughout the different drawings to designate similar components.

It will be understood that when an element is referred to as being "coupled" or "connected" to another element, it can be directly coupled or connected to the other element or intervening elements may be present therebetween. In addition, when an element is referred to as "comprising" or "including" a component, it does not preclude another component but may further include the other component unless the context clearly indicates otherwise.

It will be understood that when an element is referred to as being "on" another element, it can be directly on another element or intervening elements may be present therebetween. In contrast, when an element is referred to as being "directly on" another element, there are no intervening elements therebetween.

It will be understood that, although the terms first, second, third, etc. may be used herein to describe various elements, components, regions, layers and/or sections, but are not limited thereto. These terms are only used to distinguish one element, component, region, layer, or section from another element, component, region, layer, or section. Therefore, a first element, component, region, layer, or section discussed below could be termed a second element, component, region, layer, or section without departing from the teachings of the present invention.

The technical terms used in the present specification are set forth to mention a specific embodiment of the present invention, and do not intended to define the scope of the present invention. As used herein, the singular forms "a", "an" and "the" are intended to include the plural forms as well, unless the context clearly indicates otherwise. In the present specification, the term "including" is intended to embody specific properties, regions, integers, steps, operations, elements and/or components, but is not intended to exclude presence or addition of other properties, regions, integers, steps, operations, elements, components and/or groups.

Spatially relative terms, such as "below", "above", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the drawings. For example, if the device in the figures is turned over, elements described as "below" other elements or features would then be oriented "above" the other elements or features. Therefore, the exemplary term "below" can encompass both an orientation of above and below. Devices may be otherwise rotated 90 degrees or at other angles and the spatially relative descriptors used herein interpreted accordingly.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A wind power generator is equipment designed and manufactured to produce the optimum output taking into account changes in speed and direction of wind. To realize the optimum control, the wind power generator may perform not only torque control but also pitch and yaw control using a programmable logic controller. Generally, in the wind power generator, there may be a constant speed section and a variable speed section in which rotating speeds of a rotor and a gearbox shaft vary within a range from a value corresponding to a cut-in wind speed of 3 m/s to a value corresponding to a cut-out wind speed of 25 m/s.

FIG. 1 is a diagram illustrating positions of sensors for monitoring conditions of vibration of a wind power generator according to an embodiment of the present invention.

Referring to FIG. 1, to monitor conditions of vibration of the wind power generator, a plurality of acceleration sensors capable of sensing a change in speed per time, and a laser tachometer capable of measuring the RPM of an object may be provided. The sensors may be installed in a housing at positions adjacent to a main bearing 110, a gearbox 120, and a generator 130 of the wind power generator. In the wind power generator which is a structure for generating power using rotation of a main shaft, the main bearing 110 is a part which supports the weight of the structure and makes the rotation of the main shaft possible. The main bearing 110 is an important element in terms not only of operational performance of rotational equipment but also of maintenance thereof. The gearbox 120 is a device which uses gears and increases the rotating speed of energy supplied from an impeller of the wind power generator to set the rotating speed to a value suitable for generating power. The gearbox 120 introduced in an embodiment of the present invention has a three-stage structure in which each of first and second gear stages pertain to a planetary gear structure and a third gear stage pertains to a helical gear structure. A drive shaft of the gearbox 120 is coupled to a planetary gear of the second gear stage, and a driven shaft is coupled to the generator 130 so that the rotating speed of energy to be input to the generator 130 can be increased by the gearbox 120. The generator 130 is a device which generates power using input rotational energy. The main bearing 110, the gearbox 120, and the generator 130 may be key components of the wind power generator.

In more detail, referring to FIG. 1, the wind power generator according to the embodiment of the present invention may be provided with fifteen acceleration sensors and one tachometer to monitor conditions of vibration. The tachometer may be mounted to the driven shaft of the helical gear so as to measure the RPM of the driven shaft. The measured RPM may be the same as the RPM of energy to be inputted to the generator. The fifteen acceleration sensors may be divided into nine acceleration sensors for measuring vertical acceleration, and six acceleration sensors for measuring horizontal acceleration. Each acceleration sensor may sense horizontal vibration or vertical vibration. The acceleration sensors may be mounted to housings of the corresponding main components. Two acceleration sensors may be mounted to the main bearing 110 respectively in horizontal and vertical directions so as to measure vertical and horizontal vibrations. Seven acceleration sensors may be mounted to the gearbox 120. One acceleration sensor may be mounted to each of left and right ends of a torque arm of the gear box 120 which is coupled with the main shaft. One acceleration sensor may be mounted to a mechanical pump bearing. One acceleration sensor may be mounted to a wheel bearing of the third gear stage of the gearbox. One acceleration sensor may be mounted to the drive shaft of the third gear stage of the gearbox, and two acceleration sensors may be mounted to the driven shaft of the third gear stage of the gearbox. Four acceleration sensors may be horizontally and vertically mounted to the generator 130, wherein two acceleration sensors may be horizontally and vertically mounted to a first side of the generator 130 which is coupled with the gearbox 120, and two acceleration sensors may be horizontally and vertically mounted to a second side thereof opposite to the first side. The last two acceleration sensors may be mounted to the housing of the wind power generator so as to measure front/rear direction vibration and left/right direction vibration of the wind power generator.

The fifteen acceleration sensors mounted to the wind power generator in the above-mentioned manner and the one tachometer may be used to obtain vibration data for respective parts of the wind power generator.

As shown in Table 1, the obtained vibration data may be classified into a plurality of classes according to a turbine operating region of the wind power generator before being stored. Here, class 1 may be a variable speed section, classes 2 to 5 may be constant speed sections. The term "third gear stage of gearbox" may mean the RPM of the drive shaft of the third gear stage of the gearbox which is input to the generator 130, as described above.

TABLE 1

| Class | Rotating speed of third gear stage of gearbox [rpm] | Change in rotating speed [rpm] | Time delay [s] | Produced power (P) [MW] | Pitch/Yaw movement |
|---|---|---|---|---|---|
| 1 | 700~900 | 15 | 20 | — | —/— |
| 2 | 1400~1550 | 50 | 15 | 1.6 < P < 2.0 | —/— |
| 3 | 1400~1550 | 50 | 15 | 2.0 < P < 3.0 | —/— |
| 4 | 1400~1550 | 50 | 15 | P ≥ 3.0 | Off/Off |
| 5 | 1400~1550 | 50 | 15 | P ≥ 3.0 | —/— |

To collect defect data representing deterioration in the performance of the wind power generator, there is the need of separately extracting valid characteristics referring to characteristics of defects in the variable speed section and the constant speed section. Such a valid characteristic referring to a defect may be represented by a defect frequency. With regard to characteristics of the defect frequency, statistical calculation in a time domain is performed, and, in a frequency domain, a defective portion may be detected by comparing, with mathematically calculated frequency information, a defect frequency such as a gear mesh frequency (GMF) which is a frequency generated by engagement between the main bearing 110 and a gear.

FIG. 2 is a flowchart showing a vibration monitoring and diagnosing method of a vibration monitoring and diagnosing system for the wind power generator according to an embodiment of the present invention.

Referring to FIG. 2, the entire monitoring and diagnosing method may be divided into a continuous health detection (CHD) operation S200, and an event health detection operation S300. In the continuous health detection operation S200, vibration data is analyzed in the time domain so that a statistical characteristic value is extracted to check defect conditions of the wind power generator. In the event health detection operation S300, when it is determined that a defect is present in the continuous health detection operation S200, precise diagnosis for determining the location and the kind of the generated defect may be performed by analysis in the frequency domain and an envelope frequency domain.

The continuous health detection operation S200 may include operation S180 of collecting vibration data from the sensors, operation S220 of classifying the collected vibration data into the classes according to operation conditions shown in Table 1, and operation S230 of extracting a characteristic value of the time domain from the vibration data for each vibration location for each class. If the extracted characteristic value is greater than an alarm setting value, it is determined that there is a defect, in operation S240, so that the process enters the even health detection operation S300. If the extracted characteristic value is the alarm setting value or less, it is determined that the wind power generator is in a normal state, so that the continuous health detection operation S200 is continuously performed.

The characteristic values extracted in the continuous health detection operation S200 may include a root mean square, kurtosis, and a crest factor. The root mean square may be calculated by Equation 1, the kurtosis may be calculated by Equation 2, and the crest factor may be calculated by Equation 3.

$$x_{rms} = \sqrt{\frac{\sum_{i=1}^{n} x_i^2}{n}} \quad \text{Equation (1)}$$

$$x_k = \frac{E(y_i)^4}{\sigma^4} = \frac{\frac{1}{n}\sum_{i=1}^{n}(x_i - \bar{x})^4}{\left(\sqrt{\frac{1}{n}\sum_{i=1}^{n}(x_i - \bar{x})^2}\right)^4} \quad \text{Equation (2)}$$

$$x_c = \frac{|x_{peak}|}{x_{rms}} \quad \text{Equation (3)}$$

Here, $x_i$ denotes collected vibration data, $\bar{x}$ denotes an average of the vibration data, and $|x_{peak}|$ denotes the peak value of the absolute value of the vibration data. The alarm setting value may be set with reference to ISO 10816-3 standard or VDI3834-1 standard.

In the event health detection operation S300, the precise diagnosis capable of determining the defective portion can be performed in such a way that a frequency domain analysis operation S310 and an envelope frequency domain analysis operation S340 are performed, and it is checked whether vibration in a defect frequency to be calculated by the following equations 4 to 9 has a value greater than a normal value.

FIG. 3 is a flowchart showing a frequency domain analysis process according to an embodiment of the present invention.

Referring to FIG. 3, the frequency domain analysis operation S310 may be separately performed for each of the classes classified in the CHD operation. To perform the frequency domain analysis operation S310, a fast Fourier transform (FFT) operation S311 is performed using vibration data for each class. In operation S313, a narrowband peak extraction method may be used to extract the peak value in each narrowband. Based on this, a frequency matrix may be formed, in operation S315. Here, the defect determination operation may be performed using the extracted peak value, and the frequency matrix may be used to easily display an associated defective region on a display later.

FIG. 4 is a diagram illustrating a frequency characteristic obtained by performing an FFT operation for vibration data and a method of extracting a narrowband peak according to an embodiment of the present invention.

The method of extracting a narrowband peak will be described in more detail with reference to FIG. 4. The method of extracting the narrowband peak is a method in which a frequency calculated by Equations 4 to 9 is used as a center frequency, a band having opposite ends, each of which is spaced apart from the center frequency by 1 Hz, and the peak value is extracted from the band.

$$f_r = \frac{\text{rpm}}{60} = rps \quad \text{Equation (4)}$$

$$FTF = f_c = \frac{f_r}{2}\left[1 - \frac{B_d}{P_d}\cos\phi\right] \quad \text{Equation (5)}$$

$$BSF = f_s = \frac{P_d}{2B_d}f_r\left[1 - \left(\frac{B_d}{P_d}\cos\phi\right)^2\right] \quad \text{Equation (6)}$$

-continued $$BPFO = f_o = N(FTF) = \frac{f_r}{2}N\left[1 - \frac{B_d}{P_d}\cos\phi\right] \quad \text{Equation (7)}$$

$$BPFI = f_i = N(f_r - FTF) = \frac{f_r}{2}N\left[1 + \frac{B_d}{P_d}\cos\phi\right] \quad \text{Equation (8)}$$

$$GMF = (T_R + T_S) \times N_O = (T_R \times N_R) + (N_S \times T_S) \quad \text{Equation (9)}$$

Equations 4 to 8 are provided to calculate a defect frequency of the bearing. Here, $f_r$ denotes an RPM of a shaft, $f_c$ denotes a fundamental train frequency (FTF), $f_s$ denotes a ball spin frequency (BSF), $f_o$ denotes a ball pass frequency of an outer ring (BPFO), $f_i$ and denotes a ball pass frequency of an inner ring (BPFI). With regard to the parameters used in the foregoing equations, referring to FIG. 5, $B_d$ denotes a diameter of a bearing ball, $P_d$ denotes a pitch diameter, N denotes the number of balls, and $\phi$ denotes a contact angle. Equation 9 is an equation for calculating a GMF of a planetary gear of the gearbox 120. With regard to the parameters used in this equation, referring to FIG. 6, $T_R$ denotes the number of teeth of a ring gear 510, $T_S$ denotes the number of teeth of a sun gear 520, $N_O$ denotes an RPM of a carrier 530, and $N_S$ denotes an RPM of a sun gear 520.

FIG. 7 is a flowchart showing an envelope frequency domain analysis process according to an embodiment of the present invention.

Referring to FIG. 7, to perform the envelope frequency domain analysis operation S340, an envelope using vibration data for each class may be extracted, in operation S341. The envelope may be extracted by passing the vibration data through a band pass filter, extracting the absolute value thereof, and performing a low pass filter processing operation. In operation S343, an FFT operation on the extracted envelope is performed, and a peak value for each narrowband is extracted by a narrowband peak extraction method in operation S345. Based on this, an envelope frequency matrix may be formed, in operation S347. Here, the defect determination operation may be performed using the extracted peak value, and the envelope frequency matrix may be used to easily display an associated defective region on a display later.

FIG. 8 is a diagram illustrating an embodiment showing a frequency matrix and an envelope frequency matrix according to the present invention.

Referring to FIG. 8, a column 810 of each of the frequency matrix and the envelope frequency matrix denotes a vibration measurement location, and a row 820 thereof denotes a frequency band calculated by Equations 4 to 6. The peak value extracted by the above-described narrowband peak extraction method refers to a value of the matrix.

Referring again to FIG. 2, in operations S320 and S350, it is determined whether a defect is present by analyzing each of the frequency domain and the envelope frequency domain and comparing the peak value obtained in certain frequency bands calculated by Equations 4 to 9 at each sensor location with the preset normal value. If a defect is present, the location and the kind of the defect may be detected based on the frequency band and the sensor location at which the peak point is obtained, in operations S330 and S360. If, in the frequency matrix or the envelope frequency matrix, the portion in which the defect is present is indicated with a color or a hash different from that of the other portion in which there is no defect, an operator can more easily recognize whether a defect is present, and the location and the kind of the defect. Referring to an example of FIG. 8, if an obtained vibration peak value 830 is greater than the preset normal value, it is determined that a defect is present, and the peak value may be indicated with a red color. Furthermore, the operator can easily recognize that the location at which the peak value is obtained corresponds to the gearbox, and the frequency band pertains to the outer ring. Therefore, in the case of the example of FIG. 8, it can be easily recognized that the defect is present in the outer ring of the gearbox.

Thereafter, the defect detected in the frequency domain and the defect detected in the envelope frequency domain are double-checked. In the case where the defect is detected in both domains, it can be determined that the probability of an actual presence of the defect is markedly increased.

FIG. 9 is a schematic block diagram of a system of detecting a vibration-based defect of the wind power generator according to an embodiment of the present invention.

Referring to FIG. 9, the system of detecting a vibration-based defect of the wind power generator may include a sensor unit 910, an abnormal state detection unit 920, a precise diagnosis unit 930, and a display unit 940.

The sensor unit 910 may include acceleration sensors and a tachometer which are mounted to the main parts of the wind power generator, as shown in FIG. 1. The acceleration sensors and the tachometer may collect vibration data of the main parts of the wind power generator and store the collected vibration data in a device for detecting a defect of the wind power generator. In more detail, the tachometer may be mounted to the driven shaft of the helical gear so as to measure the RPM of the driven shaft. The measured RPM may be the same as the RPM of energy to be inputted to the generator. The fifteen acceleration sensors may be divided into nine acceleration sensors for measuring vertical acceleration, and six acceleration sensors for measuring horizontal acceleration. Each acceleration sensor may sense horizontal vibration or vertical vibration. The acceleration sensors may be mounted to the housings of the corresponding main components. Two acceleration sensors may be mounted to the main bearing 110 respectively in horizontal and vertical directions so as to measure vertical and horizontal vibrations. Seven acceleration sensors may be mounted to the gearbox 120. One acceleration sensor may be mounted to each of left and right ends of a torque arm of the gear box 120 which is coupled with the main shaft. One acceleration sensor may be mounted to a mechanical pump bearing. One acceleration sensor may be mounted to a wheel bearing of the third gear stage of the gearbox. One acceleration sensor may be mounted to the drive shaft of the third gear stage of the gearbox, and two acceleration sensors may be mounted to the driven shaft of the third gear stage of the gearbox. Four acceleration sensors may be horizontally and vertically mounted to the generator 130, wherein two acceleration sensors may be horizontally and vertically mounted to a first side of the generator 130 which is coupled with the gearbox 120, and two acceleration sensors may be horizontally and vertically mounted to a second side thereof opposite to the first side. The last two acceleration sensors may be mounted to the housing of the wind power generator so as to measure front/rear direction vibration and left/right direction vibration of the wind power generator.

The abnormal state detection unit 920 detects whether the wind power generator is in an abnormal state or not by extracting characteristic values such as a root mean square, kurtosis, and a crest factor, which can be statistically obtained by Equations 1 to 3, from vibration data collected by the sensor unit 910, and then checking whether the characteristic values are alarm setting values or more. If an abnormal state is detected, the abnormal state detection unit 920 transmits a signal to the precise diagnosis unit 930 so that the precise diagnosis unit 930 can perform a subsequent process.

If a signal that an abnormal state has been detected is received from the abnormal state detection unit 920, the precise diagnosis unit 930 may perform a precise diagnosis operation of extracting the location at which the defect has occurred and the kind of defect through the frequency domain analysis or the envelope frequency domain analysis. The display unit 940 may display the characteristic values obtained from the abnormal state detection unit, and the frequency matrix and the envelope frequency matrix which are the results of the analysis on the frequency domain and the envelope frequency domain that are obtained from the precise diagnosis unit.

FIG. 10 is a diagram illustrating an embodiment of displaying an analysis result on the display unit 940 according to the present invention.

Referring to FIG. 10, the X-axis of the display may represent the locations of the sensors included in the sensor unit 910, and the Y-axis may represent characteristic values in the time domain and the frequency domain. Furthermore, according to the operation domain, data may be classified into classes, as shown in Table 1, and the classes may be arranged along the Z-axis. In addition, the original vibration data collected by the sensors of the sensor unit 910 may also displayed on the display unit 940. In detail, the root mean square, the kurtosis, and the crest factor of each sensor may be displayed in the time domain 1010 based on the location of each sensor and the data collected from the sensor. The frequency matrix and the envelope frequency matrix obtained by the frequency domain analysis operation S310 and the envelope frequency domain analysis operation S320 of the above-mentioned event health detection operation S300 may be displayed in the frequency and envelope frequency domains 1020. The vibration data domain 1030 may display the vibration data substantially obtained from the sensors as it is. Particularly, in the case where an abnormal state is detected, the value of the defect is displayed with a color or a hash different from that of the other portions, thus allowing the user to easily recognize the abnormal state.

FIG. 11 is a diagram illustrating another embodiment of displaying an analysis result on the display unit 940 according to the present invention.

Referring to FIG. 11, the display unit 940 may include a fundamental information unit 1110, a gear unit 1120, and a bearing unit 1130.

The fundamental information unit 1110 may display fundamental information about the wind power generator. The fundamental information may include information about a site where the wind power generator is installed, summary information including information about the time during which the vibration data is collected, operation data and filter information including a wind speed, a generator speed, generator production power, etc. of the wind power generator which is currently operated, and a shock finder configured to indicate, based on a preset filter range, the number of sensors which undergo vibration corresponding to the filter range.

Each of the gear unit 1120 and the bearing unit 1130 may include a column 1121, 1131 which represents installation locations of vibration sensors, a part 1123, 1133 which represents characteristic values of vibration data by each vibration sensor, and a part 1125, 1135 which sets a filter value. Since the gear unit 1120 and the bearing unit 1130 may differ from each other in vibration data, there is a need for displaying the characteristic values of the vibration data of respective different regions of the display unit 940. In particular, among the characteristic values of the vibration data by the vibration sensors, a characteristic value corresponding to the preset filter value is displayed with a color or a hash distinguished from that of the other values, as designated by reference numerals 1127 and 1137, thus allowing the user to easily recognize the location at which the defect is present, and the kind of defect corresponding to the center frequency.

As described above, the present invention measures and analyzes vibrations on main regions of a wind power generator, thus making it possible to precisely diagnose a defect, thereby detecting malfunction of a component in early stages, and preventing a serious accident.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A fault detecting method of detecting a fault in a wind power generator using vibration data, the wind power generator including a main bearing, a gearbox, and a generator, the fault detecting method comprising:

receiving the vibration data of the wind power generator from a plurality of sensors including a tachometer mounted to a driven shaft extending from the gearbox to the generator and configured to measure a rotational speed of the driven shaft and a plurality acceleration sensors disposed throughout the wind power generator;

extracting a first characteristic value in a time domain based on the vibration data;

determining whether the first characteristic value is greater than an alarm setting value; and determining, when the first characteristic value is determined to be greater than the alarm setting value, whether there is the fault by extracting a characteristic value in a frequency domain obtained by performing a Fourier transform operation on the vibration data, wherein the determining whether there is the fault comprises:

extracting, based on the vibration data received by the plurality of sensors, second characteristic values in the frequency domain, for one or more preset frequency bands by each of the plurality of sensors;

extracting, based on the vibration data received by the plurality of sensors, third characteristic values in an envelope frequency domain for the one or more preset frequency bands by each of the plurality of sensors in an envelope frequency domain;

determining that the fault is present when at least one from among a characteristic value of the second characteristic values or a characteristic value of the third characteristic values is equal to or greater than a preset normal value; and determining, when the at least one from among the characteristic value of the second characteristic values or the characteristic value of the third characteristic values is equal to or greater than the preset normal value, a location of the fault and a kind of the fault based on a frequency band of the preset frequency bands and a location of a corresponding sensor of the plurality of sensors, wherein the plurality of acceleration sensors are disposed and configured to respectively measure vertical and horizontal vibrations present in the main bearing, respectively measure vibrations present at either end of a torque arm of the gearbox coupled with a main shaft, measure vibration present in at least one shaft connected to a third gear stage of the gearbox, respectively measure horizontal and vertical vibrations present in either side of the generator, and detect vibration along each of two axes of the wind power generator.

2. The fault detecting method according to claim 1, wherein the first characteristic value includes at least one of a root mean square, a kurtosis, and a crest factor, wherein the root mean square ($x_{rms}$) is calculated by $$x_{rms} = \sqrt{\frac{\sum_{i=1}^{n} x_i^2}{n}},$$

the kurtosis ($x_k$) is calculated by $$x_k = \frac{E(y_i)^4}{\sigma^2} = \frac{\frac{1}{n}\sum_{i=1}^{n}(x_i - \bar{x})^4}{\left(\sqrt{\frac{1}{n}\sum_{i=1}^{n}(x_i - \bar{x})^2}\right)^4},$$

and the crest factor ($x_c$) is calculated by $$x_c = \frac{|x_{peak}|}{x_{rms}},$$

and wherein $x_i$ is the vibration data, $\bar{x}$ is an average of the vibration data, and $|x_{peak}|$ is a peak value of an absolute value of the vibration data.

3. The fault detecting method according to claim 1, wherein the extracting of the second characteristic values comprises:

performing a fast Fourier transform (FFT) operation on the vibration data; and extracting, as a second characteristic value based on a result of the performing of the FFT operation, a peak value in a frequency band which has a center corresponding to one of the one or more preset center frequencies for each of the plurality of sensors and which extends 1 Hz from either side of the preset center frequency.

4. The fault detecting method according to claim 3, wherein the one or more preset center frequencies comprise frequencies $f_r$, $f_c$, $f_s$, $f_o$, and $f_i$, and a gear mesh frequency (GMF) that are respectively calculated by Equations (1) to (6), wherein Equation (1) is $f_r = \frac{rpm}{60}$, Equation (2) is $f_c = \frac{f_r}{2}\left[1 - \frac{B_d}{P_d}\cos\phi\right]$, Equation (3) is $f_s = \frac{P_d}{2B_d}f_r\left[1 - \left(\frac{B_d}{P_d}\cos\phi\right)^2\right]$, Equation (4) is $f_o = N(FTF) = \frac{f_r}{2}N\left[1 - \frac{B_d}{P_d}\cos\phi\right]$, Equation (5) is $f_i = N(f_r - FTF) = \frac{f_r}{2}N\left[1 + \frac{B_d}{P_d}\cos\phi\right]$, and Equation (6) is $GMF = (T_R + T_S) \times N_O = (T_R \times N_R) + (N_S \times T_S)$, and wherein $f_r$ is revolutions per second of a shaft, $f_c$ is a fundamental train frequency (FTF), $f_s$ is a ball spin frequency (BSF), $f_o$ is a ball pass frequency of an outer ring (BPFO), $f_i$ is a ball pass frequency of an inner ring (BPFI), $B_d$ is a diameter of a bearing ball, $P_d$ is a pitch diameter, $N$ is a number of balls, $\phi$ is a contact angle, $T_R$ is a number of teeth of a ring gear, $T_S$ is a number of teeth of a sun gear, $N_O$ is revolutions per second of a carrier, $N_R$ is revolutions per second of the ring gear, and $N_S$ is revolutions per second of the sun gear.

5. The fault detecting method according to claim 1, wherein the extracting of the third characteristic values comprises:

extracting an envelope from the vibration data for each of the plurality of sensors;

performing a fast Fourier transform (FFT) operation based on the envelope; and extracting, as a third characteristic value based on a result of the performing of the FFT operation, a peak value in a frequency band which has a center corresponding to one of the one or more preset center frequencies for each of the plurality of sensors and which extends 1 Hz from either side of the preset center frequency.

6. The fault detecting method according to claim 5, wherein the extracting of the envelope from the vibration data comprises:

passing the vibration data through a band pass filter;

obtaining an absolute value of an output of the band pass filter; and passing the obtained absolute value through a low pass filter.

7. The fault detecting method according to claim 5, wherein the one or more preset center frequencies comprise frequencies $f_r$, $f_c$, $f_s$, $f_o$, and $f_i$, and a gear mesh frequency (GMF) that are respectively calculated by Equations (1) to (6), wherein Equation (1) is $f_r = \frac{rpm}{60}$, Equation (2) is $f_c = \frac{f_r}{2}\left[1 - \frac{B_d}{P_d}\cos\phi\right]$, Equation (3) is $f_s = \frac{P_d}{2B_d}f_r\left[1 - \left(\frac{B_d}{P_d}\cos\phi\right)^2\right]$, Equation (4) is $f_o = N(FTF) = \frac{f_r}{2}N\left[1 - \frac{B_d}{P_d}\cos\phi\right]$, Equation (5) is $f_i = N(f_r - FTF) = \frac{f_r}{2}N\left[1 + \frac{B_d}{P_d}\cos\phi\right]$, and Equation (6) is $GMF = (T_R + T_S) \times N_O = (T_R \times N_R) + (N_S \times T_S)$, and wherein $f_r$ is revolutions per second of a shaft, $f_c$ is a fundamental train frequency (FTF), $f_s$ is a ball spin frequency (BSF), $f_o$ is a ball pass frequency of an outer ring (BPFO), $f_i$ is a ball pass frequency of an inner ring (BPFI), $B_d$ is a diameter of a bearing ball, $P_d$ is a pitch diameter, N is a number of balls, φ is a contact angle, $T_R$ is a number of teeth of a ring gear, $T_S$ is a number of teeth of a sun gear, $N_O$ is revolutions per second of a carrier, $N_R$ is revolutions per second of the ring gear, and $N_S$ is revolutions per second of the sun gear.

8. The fault detecting method according to claim 1, further comprising:
forming a frequency matrix having respective locations of the plurality of sensors and the one or more preset frequency bands as a row and a column and having the second characteristic values as values of the matrix, and an envelope frequency matrix having respective locations of the plurality of sensors and the preset frequency bands as a row and a column and having the third characteristic values as values of the matrix; and
displaying the frequency matrix and the envelope frequency matrix on a display.

9. The fault detecting method according to claim 1,
wherein the vibration data is classified into a plurality of classes according to operation conditions, and
wherein operations are performed for each of the plurality of classes.

10. A fault detecting system for detecting a fault in a wind power generator including a main bearing, a gearbox, and a generator using vibration data received from a plurality of sensors, the fault detecting system comprising:
a sensor unit comprising the plurality of sensors including a tachometer mounted to a driven shaft extending from the gearbox to the generator and configured to measure a rotational speed of the driven shaft and a plurality acceleration sensors disposed throughout the wind power generator, the plurality of sensors being configured to receive the vibration data;
at least one processor configured to implement:
an abnormal state detection unit configured to extract a first characteristic value in a time domain based on the vibration data received by the sensor unit and detect whether the wind power generator is in an abnormal state; and
a precise diagnosis unit configured to determine, when an abnormal state detection signal is received from the abnormal state detection unit, a location and a kind of a fault by extracting a characteristic value in a frequency domain obtained by performing a Fourier transform operation on the vibration data received by the sensor unit
wherein the plurality of acceleration sensors are disposed and configured to
respectively measure vertical and horizontal vibrations present in the main bearing,
respectively measure vibrations present at either end of a torque arm of the gearbox coupled with a main shaft,
measure vibration present in at least one shaft connected to a third gear stage of the gearbox,
respectively measure horizontal and vertical vibrations present in either side of the generator, and
detect vibration along each of two axes of the wind power generator.

11. The fault detecting system according to claim 10, wherein the abnormal state detection unit calculates a first characteristic value including at least one of a root mean square, a kurtosis, and a crest factor, wherein the root mean square ($x_{rms}$) is calculated by $$x_{rms} = \sqrt{\frac{\sum_{i=1}^{n} x_i^2}{n}},$$

the kurtosis ($x_k$) is calculated by $$x_k = \frac{E(y_i)^4}{\sigma^2} = \frac{\frac{1}{n}\sum_{i=1}^{n}(x_i - \bar{x})^4}{\left(\sqrt{\frac{1}{n}\sum_{i=1}^{n}(x_i - \bar{x})^2}\right)^4},$$

and
the crest factor ($x_c$) is calculated by $$x_c = \frac{|x_{peak}|}{x_{rms}},$$

and
wherein $x_i$ is the vibration data, $\bar{x}$ is an average of the vibration data, and $|x_{peak}|$ is a peak value of an absolute value of the vibration data.

12. The fault detecting system according to claim 10,
wherein the precise diagnosis unit performs a fast Fourier transform (FFT) based on the vibration data,
wherein the precise diagnosis unit calculate, based on a result of performing the FFT, second characteristic values each of which is a peak value in a frequency band which has a center corresponding to one of the one or more preset center frequencies for each of the plurality of sensors and which extends 1 Hz from either side of the preset center frequency, and
wherein, when at least one of the second characteristic values is greater than a preset normal value, the precise diagnosis unit determines that the fault is present, and determines a location of the fault and a kind of the fault based both on a location of a sensor that has obtained the at least one second characteristic value and on the one or more preset center frequencies.

13. The fault detecting system according to claim 12,
wherein the one or more preset center frequencies comprise frequencies $f_r$, $f_c$, $f_s$, $f_o$, and $f_i$, and a gear mesh frequency (GMF) that are respectively calculated by Equations (1) to (6),
wherein $$\text{Equation (1) is } f_r = \frac{\text{rpm}}{60},$$

$$\text{Equation (2) is } f_c = \frac{f_r}{2}\left[1 - \frac{B_d}{P_d}\cos\phi\right],$$

$$\text{Equation (3) is } f_s = \frac{P_d}{2B_d}f_r\left[1 - \left(\frac{B_d}{P_d}\cos\phi\right)^2\right],$$

$$\text{Equation (4) is } f_o = N(FTF) = \frac{f_r}{2}N\left[1 - \frac{B_d}{P_d}\cos\phi\right],$$

$$\text{Equation (5) is } f_i = N(f_r - FTF) = \frac{f_r}{2}N\left[1 + \frac{B_d}{P_d}\cos\phi\right], \text{ and}$$

$$\text{Equation (6) is } GMF = (T_R + T_S) \times N_O = (T_R \times N_R) + (N_S \times T_S),$$

and
wherein $f_r$ is revolutions per second of a shaft, $f_c$ is a fundamental train frequency (FTF), $f_s$ is a ball spin frequency (BSF), $f_o$ is a ball pass frequency of an outer ring (BPFO), $f_i$ is a ball pass frequency of an inner ring (BPFI), $B_d$ is a diameter of a bearing ball, $P_d$ is a pitch diameter, N is a number of balls, $\phi$ is a contact angle, $T_R$ is a number of teeth of a ring gear, $T_S$ is a number of teeth of a sun gear, $N_O$ is revolutions per second of a carrier, $N_R$ is revolutions per second of the ring gear, and $N_S$ is revolutions per second of the sun gear.

14. The fault detecting system according to claim 12,
wherein the precise diagnosis unit extracts an envelope of the vibration data for each of the plurality of sensors,
wherein the precise diagnosis unit performs a fast Fourier transform (FFT) operation based on the envelope,
wherein the precise diagnosis unit calculate, based on a result of performing the FFT, third characteristic values each of which is a peak value in a frequency band which has a center corresponding to one of the one or more preset center frequencies for each of the plurality of sensors and which extends 1 Hz from either side of the preset center frequency, and
wherein, when at least one of the third characteristic values is greater than a preset normal value, the precise diagnosis unit determines that the fault is present, and determines a location of the fault and a kind of the fault based both on a location of a sensor that has obtained the at least one third characteristic value and on the preset center frequency.

15. The fault detecting system according to claim 14,
wherein the one or more preset center frequencies comprise frequencies $f_r$, $f_c$, $f_s$, $f_o$, and $f_i$, and a gear mesh frequency (GMF) that are respectively calculated by Equations (1) to (6),
wherein $$\text{Equation (1) is } f_r = \frac{\text{rpm}}{60},$$

$$\text{Equation (2) is } f_c = \frac{f_r}{2}\left[1 - \frac{B_d}{P_d}\cos\phi\right],$$

$$\text{Equation (3) is } f_s = \frac{P_d}{2B_d}f_r\left[1 - \left(\frac{B_d}{P_d}\cos\phi\right)^2\right],$$

$$\text{Equation (4) is } f_o = N(FTF) = \frac{f_r}{2}N\left[1 - \frac{B_d}{P_d}\cos\phi\right],$$

$$\text{Equation (5) is } f_i = N(f_r - FTF) = \frac{f_r}{2}N\left[1 + \frac{B_d}{P_d}\cos\phi\right], \text{ and}$$

$$\text{Equation (6) is } GMF = (T_R + T_S) \times N_O = (T_R \times N_R) + (N_S \times T_S),$$

and
wherein $f_r$ is revolutions per second of a shaft, $f_c$ is a fundamental train frequency (FTF), $f_s$ is a ball spin frequency (BSF), $f_o$ is a ball pass frequency of an outer ring (BPFO), $f_i$ is a ball pass frequency of an inner ring (BPFI), $B_d$ is a diameter of a bearing ball, $P_d$ is a pitch diameter, N is a number of balls, $\phi$ is a contact angle, $T_R$ is a number of teeth of a ring gear, $T_S$ is a number of teeth of a sun gear, $N_O$ is revolutions per second of a carrier, $N_R$ is revolutions per second of the ring gear, and $N_S$ is revolutions per second of the sun gear.

16. The fault detecting system according to claim 14, further comprising:
a display unit configured to display the first characteristic value, the second characteristic values, the third characteristic values, and the vibration data,
wherein the display unit forms a time matrix having locations of the plurality of sensors and the one or more preset center frequencies and having the first characteristic value as a value of the matrix, a frequency matrix having the locations of the plurality of sensors and the one or more preset center frequencies and having the second characteristic values as value of the matrix, an envelope frequency matrix having the locations of the plurality of sensors and the one or more preset center frequencies and having the third characteristic values as values of the matrix, and a vibration data matrix having the locations of the plurality of sensors and the one or more preset center frequencies and having the received vibration data as a value of the matrix, and
wherein the time matrix, the frequency matrix, the envelope frequency matrix, and the vibration data matrix are successively displayed on the display unit from a top thereof to a bottom.

17. The fault detecting system according to claim 14, further comprising:
a display unit configured to display the first characteristic value, the second characteristic values, and the third characteristic values,
wherein the display unit is further configured to display:
a fundamental information unit configured to display summary information including information about a site where the wind power generator is installed and information about a time during which the vibration data is received, operation data and filter information including a wind speed, a speed of the wind power generator, and production power of the wind power generator, and a shock finder configured to indicate, based on a preset filter range, the number of the plurality of sensors which undergo vibration corresponding to the filter range;
a gear unit including a column representing installation locations of vibration sensor installed on gears, a part representing at least one characteristic value of the first characteristic value, the second characteristic value, and the third characteristic value for each of the vibration sensors, and a part setting a filter value; and
a bearing unit including a column representing installation locations of vibration sensor installed on bearings, a part representing at least one characteristic value of the first characteristic value, the second characteristic value, and the third characteristic value for each of the vibration sensors, and a part setting a filter value, and wherein the display unit displays a characteristic value corresponding to the set filter value with a color that is different from a color of the other characteristic values so as to distinguish the corresponding characteristic value from the other characteristic values so that a user can recognize the location and the kind of the defect.

18. The fault defect detecting system according to claim 10,
wherein the plurality of acceleration sensors comprise
two acceleration sensors configured to measure the vertical and horizontal vibrations on the main bearing,
one acceleration sensor provided on each of an left end and a right end of the torque arm of the gearbox coupled with the main shaft,
one acceleration sensor configured to measure vibration of a mechanical pump bearing,
one acceleration sensor configured to measure vibration of a wheel bearing of the third gear stage of the gearbox, one acceleration sensor configured to measure vibration of a drive shaft of the third gear stage of the gearbox, two acceleration sensors configured to measure vibration of a driven shaft of the third gear stage of the gearbox, two acceleration sensors configured to measure the horizontal and vertical vibrations at a side of the generator which is coupled with the gearbox so as to measure vibration of the generator, two acceleration sensors configured to measure the horizontal and vertical vibrations at a side opposite to the side of the generator that is coupled with the gearbox, and two acceleration sensors configured to detect front/rear direction vibration and left/right direction vibration of the wind power generator.

* * * * *